(12) United States Patent
St-Pierre et al.

(10) Patent No.: US 7,132,179 B2
(45) Date of Patent: Nov. 7, 2006

(54) METHODS AND APPARATUS FOR IMPROVING THE COLD STARTING CAPABILITY OF A FUEL CELL

(75) Inventors: Jean St-Pierre, Vancouver (CA); NengYou Jia, Richmond (CA); Marian Van Der Geest, Vancouver (CA); Abderrahmane Atbi, Vancouver (CA); Herwig R. Haas, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 463 days.

(21) Appl. No.: 10/109,982

(22) Filed: Mar. 28, 2002

(65) Prior Publication Data

US 2003/0186093 A1    Oct. 2, 2003

(51) Int. Cl.
*H01M 8/04* (2006.01)
(52) U.S. Cl. .......................................... 429/13
(58) Field of Classification Search ................ 429/13, 429/22, 23
See application file for complete search history.

(56) References Cited

U.S. PATENT DOCUMENTS

| | | | |
|---|---|---|---|
| 3,198,664 A | 8/1965 | Kunz | 136/86 |
| 3,296,029 A | 1/1967 | Davis | 136/86 |
| 3,507,702 A | 4/1970 | Sanderson | 136/86 |
| 4,729,932 A | 3/1988 | McElroy | 429/34 |
| 5,041,344 A | 8/1991 | Kamoshita et al. | 429/26 |
| 5,082,753 A | 1/1992 | Shimizu et al. | 429/26 |
| 5,084,144 A | 1/1992 | Reddy et al. | 205/104 |
| 5,200,278 A | 4/1993 | Watkins et al. | 429/24 |
| 5,230,966 A | 7/1993 | Voss et al. | 429/26 |
| 5,262,249 A | 11/1993 | Beal et al. | 429/26 |
| 5,366,818 A | 11/1994 | Wilkinson et al. | 429/13 |
| 5,478,662 A | 12/1995 | Strasser | 429/13 |
| 5,482,790 A | 1/1996 | Yamada et al. | 429/26 |
| 5,503,944 A | 4/1996 | Meyer et al. | 429/13 |

(Continued)

FOREIGN PATENT DOCUMENTS

DE    197 57 318    12/1997

(Continued)

OTHER PUBLICATIONS

Adhart, "Environmental Testing of SPE Fuel Cell Assemblies", *Proceedings of the 29th Power Sources Conference*, Jun. 9-12, (1980).

(Continued)

*Primary Examiner*—Mark Ruthkosky
(74) *Attorney, Agent, or Firm*—Seed IP Law Group PLLC

(57) ABSTRACT

Apparatus and methods of ceasing operation of an electric power generating system improve the cold starting capability of the system. The system comprises a fuel cell stack connectable to an external circuit for supplying power to the external circuit. The stack comprises at least one solid polymer fuel cell, and the system further comprises a fuel passage for directing a fuel stream through the stack and an oxidant passage for directing an oxidant stream through the stack, a sensor assembly connected to the stack for monitoring a parameter indicative of stack performance, a controller for controlling at least one stack operating parameter, and a control system communicative with the sensor assembly and stack operating parameter controller. The method comprises adjusting at least one stack operating parameter to cause the stack to operate under a drying condition that causes a net outflux of water from the stack, operating the stack under the drying condition until the water content in the stack has been reduced, and interrupting supply of power from the stack to the external circuit.

20 Claims, 7 Drawing Sheets

U.S. PATENT DOCUMENTS

| | | | |
|---|---|---|---|
| 5,648,182 A | 7/1997 | Hara et al. | 429/20 |
| 5,798,186 A | 8/1998 | Fletcher et al. | 429/13 |
| 5,935,726 A | 8/1999 | Chow et al. | 429/13 |
| 6,068,941 A | 5/2000 | Fuller et al. | 429/13 |
| 6,103,410 A | 8/2000 | Fuller et al. | 429/13 |
| 6,376,110 B1 | 4/2002 | Koschany | 429/13 |

FOREIGN PATENT DOCUMENTS

| | | |
|---|---|---|
| DE | 10150386 | 4/2003 |
| EP | 0 878 860 | 11/1998 |
| GB | 1296831 | 11/1972 |
| JP | 59-073854 | 4/1984 |
| JP | 60-138855 | 7/1985 |
| JP | 61-045569 | 3/1986 |
| JP | 06-223855 | 8/1994 |
| JP | 11-273704 | 10/1999 |
| JP | 2000-315514 | 11/2000 |
| JP | 2000-324617 | 11/2000 |
| WO | WO 95/18469 | 7/1995 |
| WO | WO 97/48142 | 12/1997 |
| WO | WO 00/002282 | 1/2000 |
| WO | WO 00/30200 | 5/2000 |
| WO | WO 00/65676 | 11/2000 |
| WO | WO 2000/65676 | * 11/2000 |

OTHER PUBLICATIONS

Rieke et al. "Temperature Dependence of Water Content and Proton Conductivity in Polyperfluorosulfonic Acid Membranes", *Journal of Membrane Science*, vol. 32 pp. 313-328 (1987).

Tasaka et al. "Freezing and Nonfreezing Water in Charged Membranes", *Journal of Membrane Science*, vol. 38, pp. 175-183 (1988).

Bernardi, "Water-Balance Calculations for Solid-Polymer-Electrolyte Fuel Cells", *J. Electrochem. Soc.*, vol. 137, No. 11, pp. 3344-3350 (Nov. 1990).

Yoshida et al. "Behavior of Water in perflourinated ionomer membranes containing various monovalent cations", *Journal of Membrane Science*, vol. 68, pp. 1-10 (1992).

Chen et al. "Studies of Water in Nafion Membranes Using Zdeuteron and Oxygen-17 Nuclear Magnetic Resonance, and Dielectric Relaxation Techniques", *J. Electrochem. Soc.*, vol. 140, No. 4, pp. 889-895 (Apr. 1993).

Holleck, "Near-Ambient Solid Polymer Fuel Cell", Final Report, EIC Laboratories, Norwood, Massachusetts, (Jul. 1993).

Wilson et al. "Endurance Testing of Low Pt Loading Polymer Electrolyte Fuel Cells", *Proceedings of the Symposium on Electrode Materials and Process for Energy Conversion and Storage*, vol. 94-23, pp. 145-154 (1994).

Simpson et al. "Factors Affecting the Performance of Proton Exchange Membrane Fuel Cells", *Proceedings of the First International Symposium on Proton Conducting Membrane Fuel Cells I*, vol. 95-23, pp. 182-192 (1995).

Sen et al. "Determination of Water Content and Resistivity of Perfluorosulfonic Acid Fuel Cell Membranes" *Mat. Res. Soc. Symp. Proc.*, vol. 393, pp. 157-162 (1995).

Cappadonia et al. "Conductance of Nafion 117 membranes as a function of temperature and water content", *Solid State Ionics*, vol. 77, pp. 65-69 (1995).

Grot et al. "Evaluation of the Humidifcation Requirements of New Proton Exchange Membranes for Fuel Cells", *Mat. Res. Soc. Symp. Proc*, vol. 393, pp. 163-168, (1995).

St-Pierre et al. Advanced Water Management Techniques for Solid Polymer Fuel Cells, *Modern Battery Systems II*, pp. 318-329 (1997).

Büchi et al. "Operating Proton Exchange Membrane Fuel Cells Without External Humidification of the Reactant Gases", *J. Electrochem. Soc.*, vol. 144, No. 8, pp. 2767-2772 (Aug. 1997).

Van Bussel et al. "Dynamic model of solid polymer fuel cell water management", *Journal of Power Sources*, vol. 71, pp. 218-222 (1998).

Watanabe et al. "Analyses of Self-Humidification and Suppression of Gas Crossover in Pt-Dispersed Polymer Electrolyte Membranes for Fuel Cells", *Journal of Electrochem. Soc.*, vol. 145, pp. 134-1141, (Apr. 1998).

Srinivasan et al. "High Energy Density Proton Exchange Membrane Fuel Cell with Dry Reactant Gases", Center for Electrochemical Systems And Hydrogen Research, Texas A&M University System, pp. 513-516 No Date.

* cited by examiner

METHODS AND APPARATUS FOR IMPROVING THE COLD STARTING CAPABILITY OF A FUEL CELL

CROSS-REFERENCE TO RELATED APPLICATION(S)

This application is related to and claims priority benefits under 35 USC 119(e) from U.S. Provisional patent application Ser. No. 09/819,506, filed Mar. 28, 2001, entitled "Methods and Apparatus for Improving the Cold Starting Capability of a Fuel Cell", formerly U.S. Application Ser. No. 09/819,506, which was converted to a provisional application by a petition filed Mar. 22, 2002. The '339 application is incorporated herein by reference in its entirety.

FIELD OF THE INVENTION

The present invention relates to techniques to improve the cold starting capabilities of an electric power generating system comprising a solid polymer fuel cell, and in particular relates to methods and apparatus for reducing water content in the fuel cell when the stack is shut down.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit.

At the anode, the fuel stream moves through the porous anode substrate and is oxidized at the anode electrocatalyst layer. At the cathode, the oxidant stream moves through the porous cathode substrate and is reduced at the cathode electrocatalyst layer to form a reaction product.

In fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of protons from the anode to the cathode. In addition to conducting protons, the membrane isolates the hydrogen-containing fuel stream from the oxygen-containing oxidant stream. At the cathode electrocatalyst layer, oxygen reacts with the protons that have crossed the membrane to form water as the reaction product. The anode and cathode reactions in hydrogen/oxygen fuel cells are shown in the following equations:

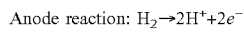

Anode reaction: $H_2 \rightarrow 2H^+ + 2e^-$

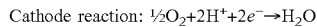

Cathode reaction: $\frac{1}{2}O_2 + 2H^+ + 2e^- \rightarrow H_2O$

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell. Separator plates typically do not have flow passages formed in the surfaces thereof, but are used in combination with an adjacent layer of material which provides access passages for the fuel and oxidant to the respective anode and cathode electrocatalyst, and provides passages for the removal of reaction products. The preferred operating temperature range for solid polymer fuel cells is typically 50° C. to 120° C., most typically about 75° C. to 85° C.

Two or more fuel cells can be electrically connected together in series to increase the overall power output of the assembly. In series arrangements, one side of a given fluid flow field or separator plate can serve as an anode plate for one cell and the other side of the fluid flow field or separator plate can serve as the cathode plate for the adjacent cell. Such a multiple fuel cell arrangement is referred to as a fuel cell stack, and is usually held together in its assembled state by tie rods and end plates. The stack typically includes inlet ports and manifolds for directing the fluid fuel stream (such as substantially pure hydrogen, methanol reformate or natural gas reformate, or a methanol-containing stream in a direct methanol fuel cell) and the fluid oxidant stream (such as substantially pure oxygen, oxygen-containing air or oxygen in a carrier gas such as nitrogen) to the individual fuel cell reactant flow passages. The stack also commonly includes an inlet port and manifold for directing a coolant fluid stream, typically water, to interior passages within the stack to absorb heat generated by the fuel cell during operation. The stack also generally includes exhaust manifolds and outlet ports for expelling the depleted reactant streams and the reaction products such as water, as well as an exhaust manifold and outlet port for the coolant stream exiting the stack. In a power generation system various fuel, oxidant and coolant conduits carry these fluid streams to and from the fuel cell stack.

When an electrical load (comprising one or more load elements) is placed in an electrical circuit connecting the stack terminals, fuel and oxidant are consumed in direct proportion to the electrical current drawn by the load, which will vary with the ohmic resistance of the load.

Solid polymer fuel cells generally employ perfluorosulfonic ion exchange membranes, such as those sold by DuPont under its NAFION® trade designation. When employing such membranes, the fuel and oxidant reactant streams are typically humidified before they are introduced to solid polymer fuel cells so as to facilitate proton transport through the ion exchange membrane and to avoid drying (and damaging) the membrane separating the anode and cathode of each cell.

Each reactant stream exiting the fuel cell stack generally contains water. The outlet fuel stream from the anodes generally contains water from the incoming fuel stream plus any product water drawn across the membrane from the cathode. The outlet oxidant stream from the cathodes generally contains water added to humidify the incoming oxidant stream plus product water formed at the cathode.

In some fuel cell applications, such as, for example, motive applications, it may be necessary or desirable to commence operation of a solid polymer electrolyte fuel cell stack when the stack core temperature is below the freezing temperature of water. As used herein, the freezing temperature of water means the freezing temperature of free water, that is, 0° C. at 1 atmosphere. It may also be necessary or desirable when ceasing operation of the solid polymer fuel cell stack to improve the cold start capability and freeze tolerance of the stack by reducing the amount of water remaining within the fuel, oxidant and coolant passages of the stack. Upon freezing, water remaining within stack passages will expand and potentially damage structures within the stack such as, for example, the membrane/electrocatalyst interface, the reactant passageways, conduits and seals, as well as the porous electrode substrate material.

If there is an expectation that a solid polymer fuel cell stack will be subjected to cold temperatures, especially temperatures below the freezing temperature of water, one or more special start-up and shutdown techniques and associated apparatus can be employed. These techniques can improve the cold start capability and freeze tolerance of the stack, and improve the subsequent fuel cell performance. A measure of electrochemical fuel cell performance is the voltage output from the cell for a given current density. Higher performance is associated with a higher voltage output for a given current density or higher current density for a given voltage output.

SUMMARY OF THE INVENTION

Water may be introduced into a fuel cell through either or both of the oxidant and fuel streams supplied to the fuel cell. Water is produced in fuel cell by the electrochemical reaction at the cathode. Water can escape the fuel cell via one or both of the oxidant and fuel exhaust streams leaving the fuel cell. If the theoretical maximum amount of water exiting the fuel cell in vapor form (for example, via the outlet reactant streams) is greater than the amount of water introduced and produced, then the fuel cell will operate under a drying condition that causes the fuel cell to dehydrate. In this case there is a "net outflux" of water. Conversely, if the amount of water introduced and produced exceeds the theoretical maximum amount of water exiting the fuel cell in vapor form, a wetting condition exists that causes water to temporarily accumulate in the cell (a net influx of water) until a steady state is achieved. A water balance exists when the influx of water and the water produced equals the theoretical outflux of water in vapor form.

A method of ceasing operation of an electric power generating system comprising a fuel cell stack connectable to an external circuit for supplying power to the external circuit is provided. The stack comprises at least one solid polymer fuel cell having a membrane electrode assembly (MEA) comprising an anode, a cathode, and an ion exchange membrane electrolyte interposed between the anode and the cathode. The system further comprises a fuel passage for directing a fuel stream through the stack and an oxidant passage for directing an oxidant stream through the stack.

In one aspect, a method of ceasing operation of such an electric power generating system comprises:
(a) establishing a drying condition in which there is a net outflux of water from the stack;
(b) operating the stack under the drying condition until the water content in the stack has been reduced;

prior to interrupting the supply of power from the stack to the external circuit. Step (a) can comprise adjusting at least one stack operating parameter to cause the stack to operate under a drying condition in which there is a net outflux of water from the stack. Suitable operating parameters include, for example, the stack temperature, the oxidant and/or fuel stream relative humidities, stoichiometries, flow rates, or pressures. Stoichiometry is the ratio of fuel or oxidant supplied to that consumed in the generation of electrical power in the fuel cell.

In an embodiment in which stack temperature is an operating parameter which is adjusted: prior to establishing a drying condition, a coolant is typically circulated through the stack to maintain the temperature of the stack within a desired operating range, and then in step (a) the stack temperature can be increased by stopping coolant circulation through the stack.

In an embodiment in which reactant relative humidity is an operating parameter which is adjusted: typically prior to establishing a drying condition at least one of the oxidant and fuel streams directed to the stack is humidified, and then in step (a) the degree of humidification of at least one of the oxidant and fuel streams can be reduced. This can be accomplished, by directing at least some of the stream to the stack without humidification or with reduced humidification. For example, at least some of the stream can be directed to the stack in fluid isolation from the humidifier, or the amount of water transferred to the supply stream can be reduced or eliminated In other embodiments at least one of the oxidant and fuel stoichiometries and/or flow rates can be increased, or at least one of the oxidant and fuel stream pressures can decreased in step (a) to cause the stack to operate under a drying condition.

In preferred embodiments, in step (b) a parameter indicative of stack performance is monitored and the operation of the system is ceased when the stack performance falls below a threshold value. Suitable parameters indicative of stack performance include, for example, the resistance, impedance or voltage of one or more fuel cells in the stack. The amount of water removed should be enough to remove at least some of the excess water from the fuel cell, but should not be so much as to dry out the membrane. Preferably the membrane water level falls is not permitted to fall below its critical moisture level (the minimum amount of water needed for the membrane to be adequately ionically conductive. Thus, the threshold value for stack performance can be selected to correspond to a critical membrane moisture level or to a moisture level a predetermined amount above the critical membrane moisture level.

In some embodiments the method can further comprise reducing the power supplied to the external circuit, prior to interrupting the supply of power from the stack to the external circuit. Whether or not the method comprises reducing the power supplied, it can further comprise varying the supply of power during the drying condition, before the supply of power to the external circuit is interrupted. For example, the power supplied can be intermittently reduced to zero. In another example, the power supplied is reduced from a first power output to a second power output, and then varied between the second power output and a third power output. In some embodiments the second power output is about five to ten percent of the first power output and the third power output is less than the second power output, and can be zero. The power output can be varied at a suitable constant or variable frequency. In certain situations the power output is desirably varied about every one to ten seconds.

As the electrochemical reaction stops after the stack is disconnected from the external circuit, interrupting the supply of power from the stack to the external circuit before taking steps to institute the drying condition, can make it easier to establish drying condition, as then product water is not being produced in the stack. So, in another aspect a method of ceasing operation of an electric power generating system comprises in sequential order:
(a) interrupting the supply of power from the fuel cell stack to the external circuit;
(b) establishing a drying condition in which there is a net outflux of water from the stack; and
(c) flowing at least one of the fuel and oxidant streams through the stack under the drying condition until the water content in the stack has been reduced.

Step (b) can comprise adjusting one or more of the stack temperature, the oxidant and/or fuel stream relative humidities, flow rates, or pressures. These parameters can be adjusted as described above to assist in establishing a drying condition.

In step (c) of this second aspect, a parameter indicative of the water content of the stack can be monitored and the flow of at least one of the oxidant and fuel streams through the stack under the drying condition stopped when the water content of the stack falls below a threshold value. Suitable parameters indicative of the water content of the stack include, for example, the resistance, impedance or open circuit voltage of one or more fuel cells in the stack, or the relative humidity of at least one of the oxidant and fuel streams exiting the stack. The threshold value for stack performance can be selected to correspond to a critical membrane moisture level or to a moisture level a predetermined amount above the critical membrane moisture level, for the membrane electrolyte in the solid polymer fuel cell(s) in the stack.

An electric power generation system comprises a fuel cell stack connectable to an external circuit for supplying electric power to the external circuit. The stack comprises at least one solid polymer fuel cell and fluid flow passages through the stack. The system further comprises a sensor assembly connected to the stack for monitoring at least one parameter indicative of stack performance, and a controller for controlling at least one stack operating parameter. The stack operating parameter controller can comprise a microcontroller. A control system is provided which is communicative with the sensor assembly and the stack operating parameter controller. Upon receipt of a shut down instruction from the control system, the stack operating parameter controller is operable to adjust at least one stack operating parameter such that the stack operates in a drying condition. This causes a net outflux of water from the stack, and the system operates until the water content in the stack has been reduced. Suitable parameters indicative of stack performance include resistance, impedance or voltage of at least one fuel cell in the stack.

The sensor assembly can further comprise at least one sensor for monitoring one or more stack operating parameters. Suitable parameters include the relative humidity, stoichiometry, flow rate or pressure of at least one of the oxidant or fuel streams, or the stack temperature or the coolant inlet and outlet temperatures. The sensor assembly can include one or more sensor cells, such as described in International Application No. PCT/CA99/00611, filed Jul. 2, 1999, entitled "Sensor Cell for an Electrochemical Fuel Cell Stack".

The stack operating parameter controller preferably comprises apparatus to control at least one stack operating parameter, such as those described above. For example, it can comprise oxidant stoichiometry control apparatus, such as a compressor connected to the oxidant inlet passage. It can comprise pressure control apparatus, such as a pressure regulator on at least one of an oxidant and fuel passage. It can comprise stack temperature control apparatus comprising a coolant system having a coolant passage through the stack and a coolant pump communicative with the control system.

In some embodiments, the electric power generation system can further comprise a humidifier for humidifying at least one of a fuel or oxidant stream supplied to the stack during normal operation. The control apparatus can then comprise a humidifier bypass system having at least one bypass conduit for directing at least some of at least one of fuel or oxidant to the stack in fluid isolation from the humidifier. Upon receipt of a shut down instruction from the control system, the humidifier bypass system can direct at least some of the oxidant or fuel streams through the associated bypass conduit. The bypass conduit can, for example, comprise an inlet end connected to one of the reactant stream passages at a location upstream of the humidifier, and an outlet end connected to the same reactant stream passage at a location downstream of the humidifier. In another example, the bypass conduit can comprise an inlet end connectable to a reactant supply, and an outlet end connected to one of the reactant stream inlet passages at a location downstream of the humidifier. The humidifier bypass system can comprise a bypass inlet valve connected to one of the reactant passages at a location upstream of the humidifier, and a bypass outlet valve connected to the same reactant passage at a location downstream of the humidifier, wherein the bypass conduit is connected to the bypass inlet and outlet valves.

In certain embodiments, the electric power generation system can further comprise apparatus for varying the amount of power supplied to the external circuit, for example, it may] can include a transient load which can be intermittently connected to receive power from the fuel cell stack. The system can further comprise apparatus for varying the frequency and duration of connection of the transient load.

In the above embodiments of an electric power generation system, the control system is preferably operable such that the drying operation is discontinued when the parameter indicative of stack performance measured by the sensor assembly reaches a threshold value.

The aspects described above can be employed to improve the freeze tolerance and cold start-up capability of an electric power generating system, by removing at least some of the excess water from fuel cells in the system before the temperature of the system falls below the freezing temperature of water.

DETAILED DESCRIPTION OF PREFERRED EMBODIMENT(S)

Figure 1:
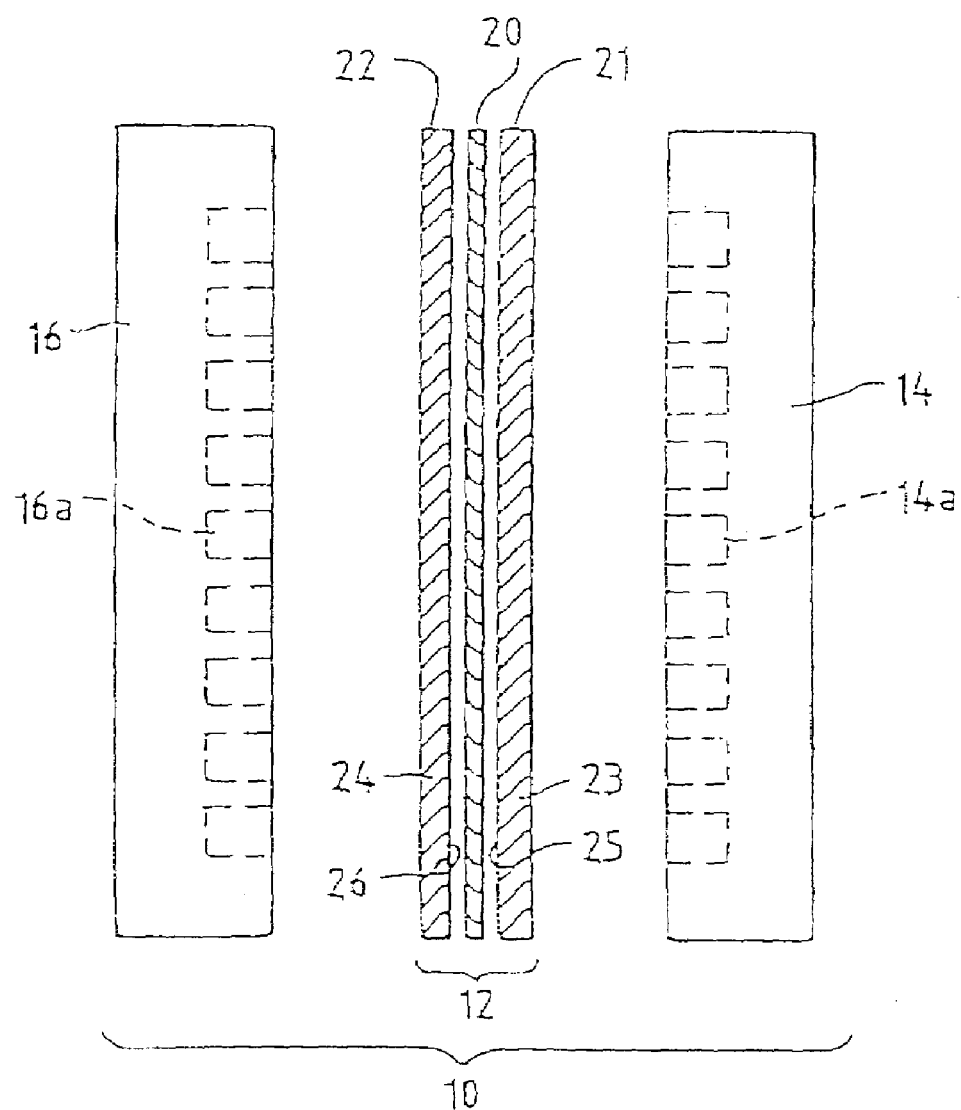
FIG. 1 is an exploded side view of a typical solid polymer electrochemical fuel cell with a membrane electrode assembly interposed between two fluid flow field plates.

FIG. 1 illustrates a typical fuel cell 10. Fuel cell 10 includes a membrane electrode assembly 12 interposed between anode flow field plate 14 and cathode flow field plate 16. Membrane electrode assembly (MEA) 12 comprises an ion exchange membrane 20 interposed between two electrodes, namely, anode 21 and cathode 22. In conventional fuel cells, anode 21 and cathode 22 comprise a substrate of porous electrically conductive sheet material 23 and 24, respectively, for example, carbon fiber paper or carbon cloth. Each substrate has a thin layer of electrocatalyst 25 and 26, respectively, disposed on one surface thereof at the interface with membrane 20 to render each electrode electrochemically active.

As further shown in FIG. 1, anode flow field plate 14 has at least one fuel flow channel 14a formed in its surface facing anode 21. Similarly, cathode separator plate 16 has at least one oxidant flow channel 16a formed in its surface facing cathode 22. When assembled against the cooperating surfaces of electrodes 21 and 22, channels 14a and 16a form the reactant flow field passages for the fuel and oxidant, respectively. The flow field plates 14, 16 are electrically conductive. Coolant channels (not shown) can also be formed on the flow field plate 14, 16 (typically on the other side of the surface having the reactant flow channels) to provide passages for flow of a coolant therethrough.

Figure 2:
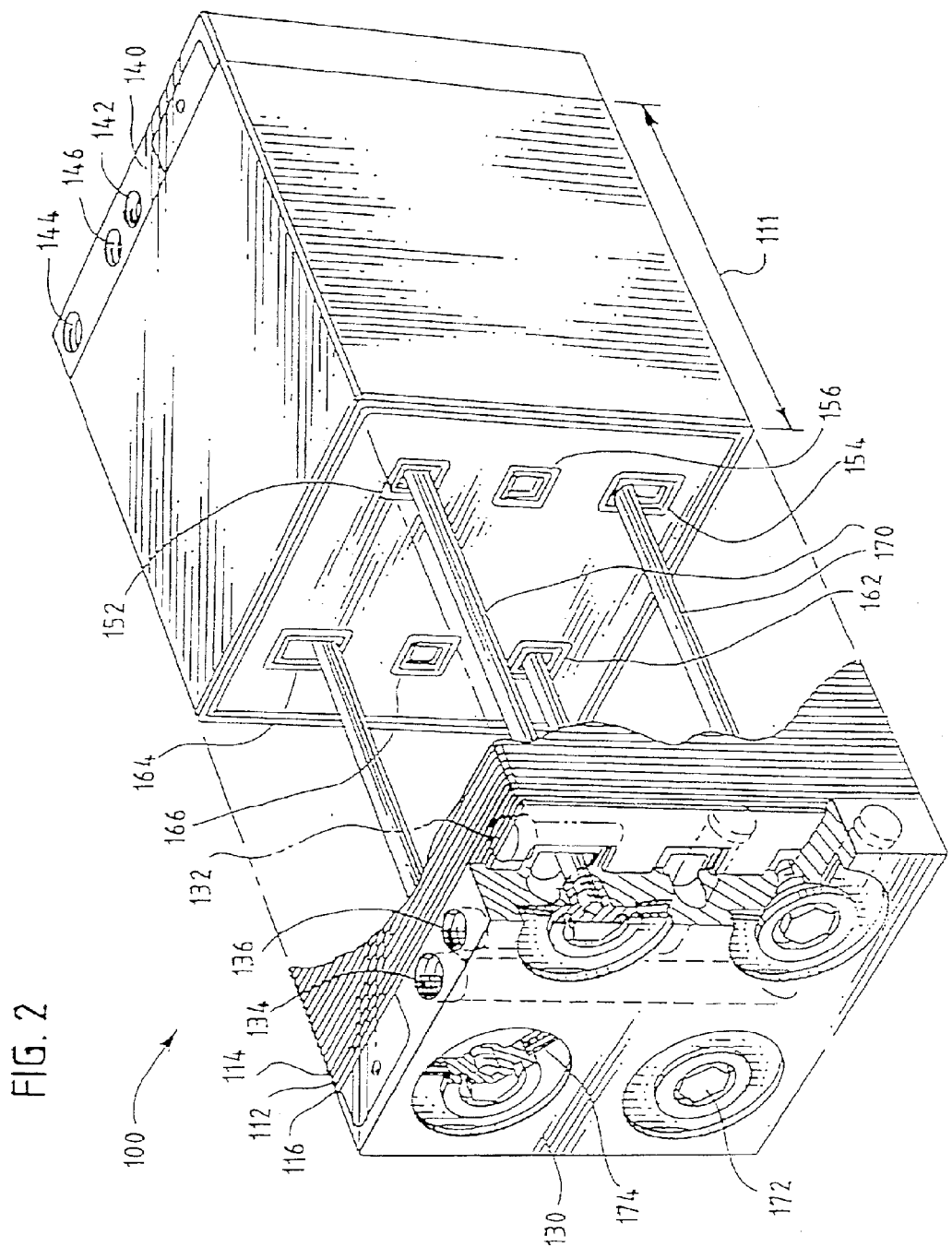
FIG. 2 is a perspective cut-away view of an electrochemical fuel cell stack.

Turning now to FIG. 2, a fuel cell stack 100 includes a plurality of fuel cell assemblies, a series of which is designated as 111 in FIG. 2. Each of the fuel cell assemblies includes a membrane electrode assembly 112 interposed between a pair of fluid flow field plates 114, 116. Fuel cell stack 100 also includes a first end plate 130 and a second end plate 140.

Plate 130 includes fluid inlet ports 132, 134, 136 for introducing fluid fuel, oxidant and coolant streams, respectively, to the stack 100. Plate 140 includes fluid outlet ports 142, 144, 146 for exhausting fluid fuel, oxidant and coolant streams, respectively, from the stack 100. The fluid outlet ports 142, 144, 146 are fluidly connected to the corresponding fluid inlet ports 132, 134, 136 via passages within the stack 100.

The fuel cell assemblies have a series of openings formed therein, which cooperate with corresponding openings in adjacent assemblies to form fluid manifolds 152, 154, 156, 162, 164, 166 within the stack 100. The fluid manifolds are each circumscribed by a sealant material or gasket. In addition, a peripheral seal at the exterior perimeter of each fuel cell fluidly isolates the interior, electrochemically active portion of the fuel cell from the external environment.

A fuel stream entering the stack 100 via fuel inlet port 132 is directed to the individual fuel flow field plates via manifold 152. After passing through the fuel flow field plate channels, the fuel stream is collected in manifold 162 and exhausted from the stack via fuel outlet port 142. Similarly, an oxidant stream entering the stack 100 via oxidant inlet port 134 is directed to individual oxidant flow field plates via manifold 154. After passing through the oxidant flow field plate channels, the oxidant stream is collected in manifold 164 and exhausted from the stack via oxidant outlet port 144. A fluid coolant (typically water) introduced via coolant inlet port 136 is directed to coolant channels (not shown) in each flow field plate, or to coolant plate assemblies (not shown) in the stack 100 via manifold 156. The coolant stream is collected in manifold 166 and exhausted from stack 100 via coolant outlet port 146. Coolant manifolds 156, 166 can be fitted with a compliant mechanism (not shown), such as tube cushions or inserts made of closed cell foam, to accommodate the expansion of freezing water. Tie rods 170 extend between end plates 130 and 140 to compress and secure stack 100 in its assembled state with fastening nuts 172 disposed at opposite ends of each tie rod 170, and disc springs 174 interposed between the fastening nuts 172 and end plates 130, 140.

Each fuel cell 10 in stack 100 can operate satisfactorily only when sufficient water is provided to keep membrane 20 wet and ionically conductive. Water can be introduced in the reactant streams and is produced in the electrochemical reaction at the cathode 22. If the theoretical maximum quantity of water escaping from fuel cell 10 in vapor form via the outlet reactant streams (assuming exhaust gases are saturated with water vapor) is greater than the water quantity introduced and produced, MEA dehydration will tend to occur. During operation, it is important to provide adequate humidification to the MEA, so as to avoid dehydrating the membrane. Mathematically this condition is expressed as:

$$N_{w,o,in} + N_{w,f,in} + N_{w,p} \geq N_{w,o,out} + N_{w,f,out} \quad (1)$$

wherein
$N_{w,o,in}$ is the inlet oxidant molar water flow rate;
$N_{w,f,in}$ is the inlet fuel molar water flow rate;
$N_{w,p}$ is the produced water molar flow rate;
$N_{w,o,out}$ is outlet oxidant molar water flow rate;
$N_{w,f,out}$ is the outlet fuel molar water flow rate.
Equation 1 terms are given by:

$$N_{w,o,in} = \frac{v_o}{\varphi_o} \frac{iA}{4F} \frac{RH_{o,in} p_{s,o,in}}{(p_{o,in} - RH_{o,in} p_{s,o,in})} \quad (2)$$

$$N_{w,f,in} = \frac{v_f}{\varphi_f} \frac{iA}{2F} \frac{RH_{f,in} p_{s,f,in}}{(p_{f,in} - RH_{f,in} p_{s,f,in})} \quad (3)$$

$$N_{w,p} = \frac{iA}{2F} \quad (4)$$

$$N_{w,o,out} = \left(\frac{v_o}{\varphi_o} \frac{iA}{4F} - \frac{iA}{4F}\right) \frac{RH_{o,out} p_{s,o,out}}{(p_{o,out} - RH_{o,out} p_{s,o,out})} \quad (5)$$

$$N_{w,f,out} = \left(\frac{v_f}{\varphi_f} \frac{iA}{2F} - \frac{iA}{2F}\right) \frac{RH_{f,out} p_{s,f,out}}{(p_{f,out} - RH_{f,out} p_{s,f,out})} \quad (6)$$

wherein,
A is the geometric active surface area;
i is the current density;
F is the Faraday constant;
$p_{f,in}$ is the inlet fuel pressure;
$p_{f,out}$ is the outlet fuel pressure;
$p_{o,in}$ is the inlet oxidant pressure;
$p_{o,out}$ is the outlet oxidant pressure;
$p_{s,f,in}$ is the inlet fuel water vapor saturation pressure;
$p_{s,f,out}$ is the outlet fuel water vapor saturation pressure;
$p_{s,o,in}$ is the inlet oxidant water vapor saturation pressure;
$p_{s,o,out}$ is the outlet oxidant water vapor saturation pressure;
$RH_{f,in}$ is the inlet fuel relative humidity;
$RH_{f,out}$ is the outlet fuel relative humidity;

$RH_{o,in}$ in is the inlet oxidant relative humidity;
$RH_{o,out}$ is the outlet oxidant relative humidity;
$v_f$ is the fuel stoichiometry;
$v_o$ is the oxidant stoichiometry;
$\phi_f$ is the hydrogen volume fraction in the dry fuel;
$\phi_o$ is the oxygen volume fraction in the dry oxidant.

Equations 5 and 6 can be somewhat simplified when it is realized that for outlet relative humidities lower than 100%, the MEA will be subjected to dehydrating conditions. Therefore, outlet relative humidities of 100% represent a limiting case defining a boundary between drying and wetting conditions (assuming that the exhaust gases are saturated with water vapor). By introducing equations (2) to (6) in equation (1) and simplifying with $RH_{o,out}=1$ and $RH_{f,out}=1$, the following equation is obtained:

$$\frac{v_o}{2\phi_o} \frac{RH_{o,in}p_{s,o,in}}{(p_{o,in} - RH_{o,in}p_{s,o,in})} + \frac{v_f}{\phi_f} \frac{RH_{f,in}p_{s,f,in}}{(p_{f,in} - RH_{f,in}p_{s,f,in})} + 1 \geq \quad (7)$$
$$\frac{1}{2}\left(\frac{v_o}{\phi_o} - 1\right)\frac{p_{s,o,out}}{(p_{o,out} - p_{s,o,out})} + \left(\frac{v_f}{\phi_f} - 1\right)\frac{p_{s,f,out}}{(p_{f,out} - p_{s,f,out})}$$

The water vapor saturation pressure is computed using a temperature dependent empirical equation:

$$\log p_s = -2.1794 + 0.02953T - 9.1837 \times 10^{-5}T^2 + 1.4454 \times 10^{-7}T^3 \quad (8)$$

The water vapor saturation pressure at each of the fuel and oxidant inlets and outlets can thus be determined by measuring the temperature at each location $T_{f,in}$, $T_{f,out}$, $T_{o,in}$, $T_{o,out}$. Generally, these temperatures are closely related to the inlet and outlet coolant temperatures ($T_{c,in}$, $T_{c,out}$), which in practice are easier to accurately measure due to the larger heat capacity of the coolant.

Each of the variables in equation (7) represents an operating parameter of fuel cell stack 100. As written, equation (7) defines an operating condition that produces a wetting condition (net influx of water into cell) or water balance (equality in equation (7)). A "water balance" is defined as a balance between water influx and water outflux when the outflux is calculated with the assumption that the exhaust is saturated with water vapor. If the equation was rewritten so that the left side is less than the right side, the equation defines an operating condition that produces a drying condition (net outflux of water).

While it is generally desirable to operate fuel cell 10 under a wetting condition such that membrane 20 is properly hydrated, excess accumulated water in MEA 12 is not desired if the stack 100 is to be cold started at or below 0° C. after the stack has been exposed to freezing conditions for an extended period of time. "Excess water" is hereby defined as the amount of water exceeding the minimum required to keep the membrane adequately ionically conductive ("critical membrane moisture level"). While some water in MEA 12 is needed to keep membrane 20 moist, excess water in MEA 12 will accumulate in pores of substrates 23, 24 and in flow channels 14a, 16a and will eventually freeze when the stack is exposed to temperatures below 0° C. for prolonged periods. If the stack is started before the MEA 12 has a chance to thaw, ice in pores of substrates 23, 24 can block or impede the flow of reactant through substrate 23, 24 and to membrane 20 in order for the electrochemical reaction to proceed. Furthermore, ice accumulation can cause mechanical stresses inside fuel cell 10 that can cause damage to stack 100. It is theorized that reducing the quantity of excess water accumulated in flow channels 14a, 16a and in the substrate pores of MEA 12 before stack 100 freezes, will reduce reactant flow blockage caused by ice, and thus reduce the time required for stack 100 to reach a nominal operating state after a cold start-up from below 0° C. or improve cell performance at sub 0° C. temperatures. This can be achieved by operating each fuel cell 10 in stack 100 under a drying condition for a period of time that is sufficient to remove at least some excess water from MEA 12 but not excessively dry out membrane 20.

As shown in equation (7) a number of stack operating parameters can be adjusted to change the operating condition of fuel cell 10, including, oxidant and fuel stoichiometries, compositions (that is, volume fraction in reactant stream), relative humidities, pressures, temperatures, and relative flow configurations (for example, concurrent and counter-flow operation). One or more of these parameters can be adjusted so that fuel cell operation is changed from a wetting condition to a drying condition or to a water balance.

A series of tests were performed to verify the MEA water flux equations (1) through (7) set out above. All tests were performed using a Ballard Mk 513 single cell having a catalyst loading of 0.3 mg Pt/cm², an N112 Nafion® membrane, and Toray CFP TGP-H-90 electrode substrates, and under the following common operating parameters: 80° C. coolant outlet, a temperature gradient of +10° C. (temperature difference between inlet and outlet coolant temperatures) at a current density of 1 A/cm², air/methanol reformate (63.5% $H_2$), 4% air bleed, 2.5 bara fuel pressure and 100% fuel inlet relative humidity (RH). The air inlet pressure, oxidant/fuel stoichiometries, and nominal current densities differed between each test. In each test, the fuel cell was first operated under a wetting condition for a period of time sufficient for the fuel cell to produce a steady state voltage. Then, the air inlet relative humidity of the fuel cell was reduced from 100% to 0% and the performance of the fuel cell was monitored by measuring the fuel cell resistance and voltage.

Figure 3:
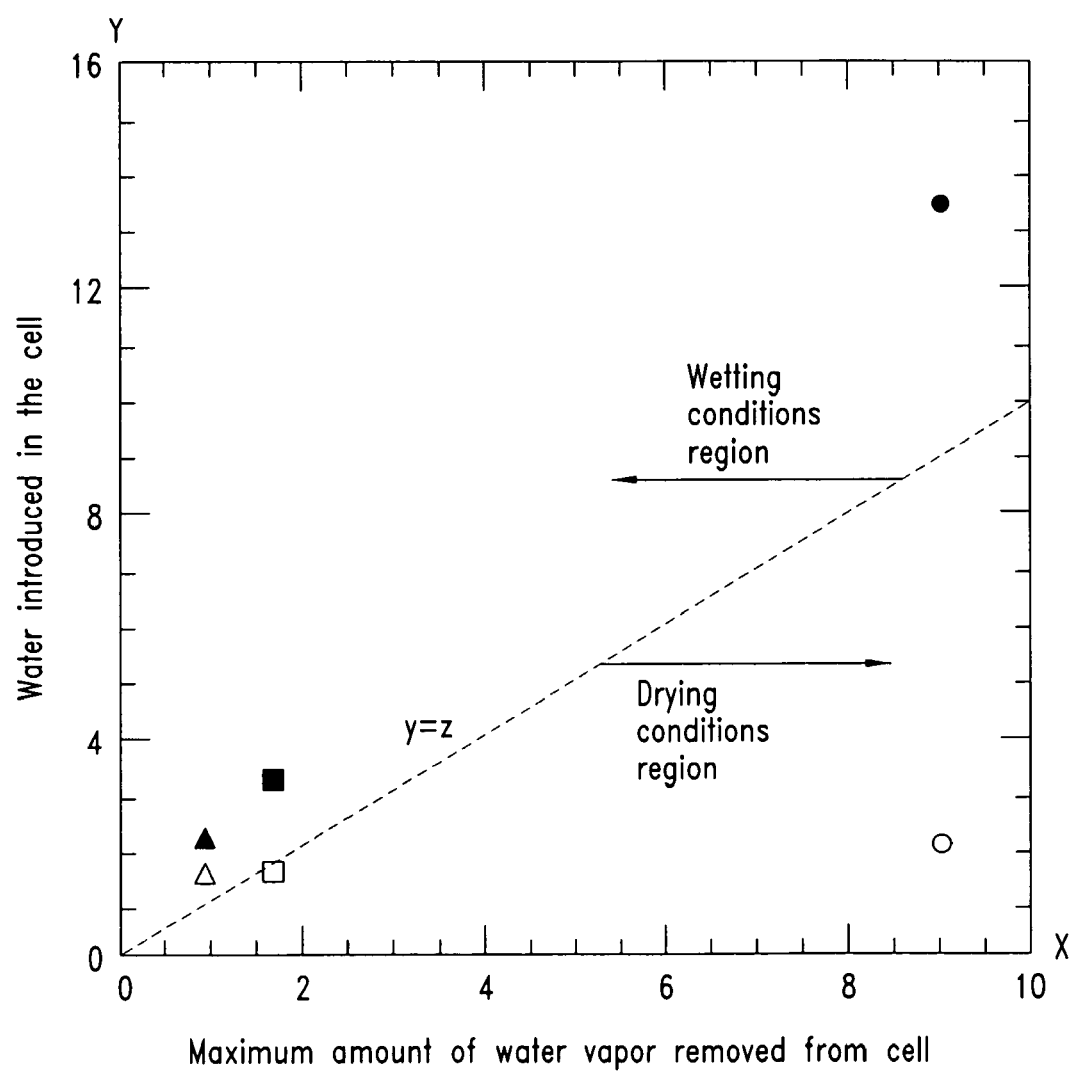
FIG. 3 is a dimensionless representation of the net water flux in a fuel cell obtained under different operating conditions.
Figure 4:
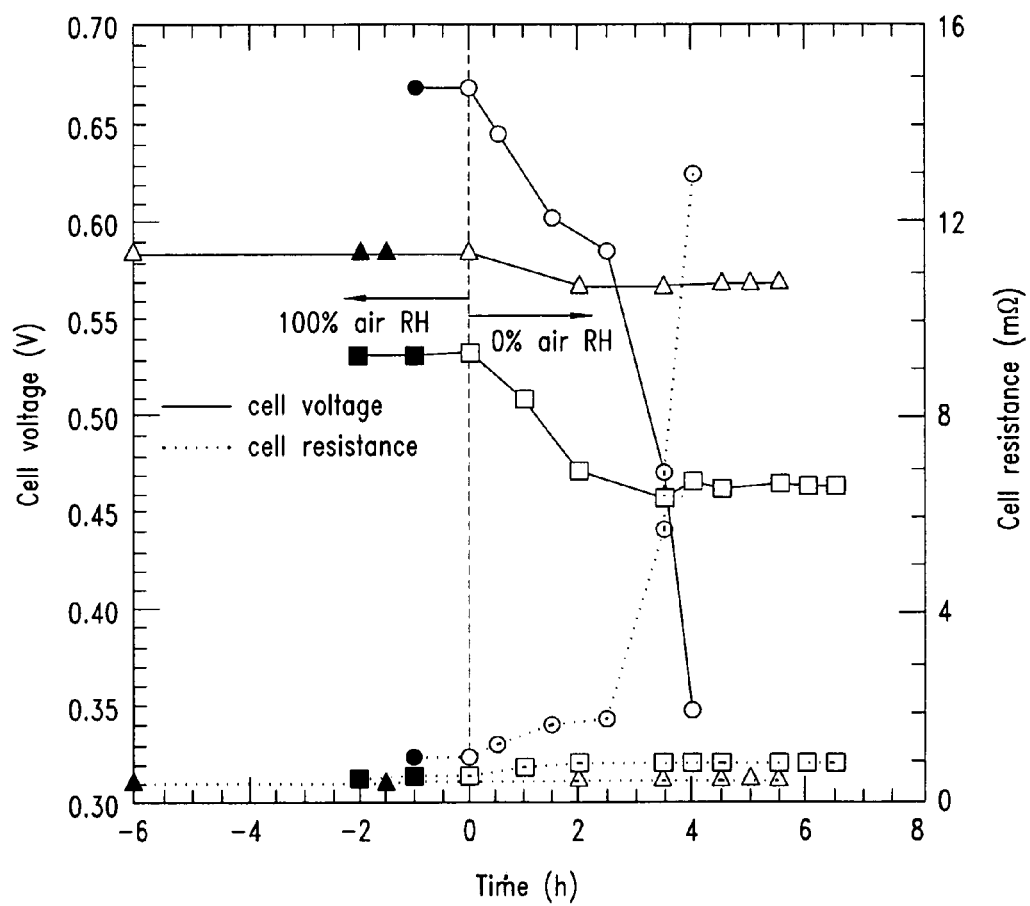
FIG. 4 is a graph showing the change in cell voltage and resistance over time for a fuel cell operated under different conditions.

FIG. 3 is a dimensionless representation of equation (7). The x and y axes represent the right hand and left hand sides of equation (7) respectively and the dashed line indicates an equality in equation (7) (water balance). The dashed line therefore separates the graph into a wetting region (y>x), and a drying region (x>y). The operating conditions of the fuel cell in each of the three test runs as theoretically derived from equations (1) through (7) are plotted in FIG. 3 as triangles, squares and circles, respectively. Filled symbols indicate a test being run at 100% air inlet relative humidity and unfilled symbols indicate a test being run at 0% air inlet relative humidity. It can be seen that the change in relative humidity for each of the three test runs shifted the fuel cell operation from the wetting region to either another location in the wetting region closer to water balance (test 1), or into the drying region (tests 2 and 3). The fuel cell was then operated under each of the three test conditions; in each test, the air inlet relative humidity was switched from 100% to 0% at Time=0. The cell responses to the change in relative humidity were recorded by measuring both MEA voltage and resistance and are plotted in FIG. 4. Cell performance is expected to drop as the membrane dries out; an increase in cell resistance and a decrease in cell voltage likely indicate that the fuel cell is being dehydrated.

The first test (illustrated as triangles in FIGS. 3 and 4) was conducted at 0.542 A/cm² current density, 2.6 bara oxidant pressure, and 1.5/1.3 oxidant/fuel stoichiometry. The first test was designed to shift the fuel cell from a point in the wetting region to another point in the wetting region that is closer to the water balance (dashed line in FIG. 3) upon the change in inlet RH (at Time=0). A small change in cell voltage and resistance (0.06 mΩ and 15 mV respectively) was found after the oxidant relative humidity was reduced from 100% to 0% at T=0. Since the cell was in theory still operating within the wetting region after the RH was changed, no significant reduction in cell performance was expected due to membrane drying. However, the operating points plotted in FIG. 3 have uncertainties attached to them, and it is possible that the first test run was in fact operating just within the drying region or that the cell performance was affected by mass transfer or other effects.

The second test (illustrated by squares in FIGS. 3 and 4) was conducted at 0.312 A/cm$^2$ current density, 1.5 bara oxidant pressure, and 1.5/1.3 oxidant/fuel stoichiometry. The second test was designed to shift the fuel cell from the wetting region to just inside the drying region. As expected, the MEA resistance significantly increased and the MEA voltage significantly decreased (0.25 mΩ and 68 mV respectively) then appeared to reach a steady state after about 4 hours. According to the water balance equations, this steady state is predicted to be only apparent, and eventually, the MEA should continue to dehydrate and eventually fail.

The third test (illustrated by circles in FIGS. 3 and 4) was conducted at 0.021 A/cm$^2$ current density, 1.1 bara oxidant pressure, and 5/2 oxidant/fuel stoichiometry. As shown in FIG. 3, the operating condition of the fuel cell after the relative humidity was reduced to 0% is deeper inside the drying region than the first two test cases, and thus, a greater drying was expected. This expectation was confirmed, as cell performance was found to drop faster and by a greater magnitude than in the first two tests.

If the fuel cell is operated under a drying condition to remove excess water therein, the drying operation should be stopped before the membrane water level falls below its critical moisture level. As the membrane dries, and especially after the membrane water level falls below its critical moisture level, the internal fuel cell resistance increases and the voltage output decreases significantly. To ensure that the drying operation does not cause the membrane to fall below the critical moisture level, the fuel cell resistance and voltage are preferably monitored during the drying operation. The drying operation is preferably stopped once the resistance or impedance has increased above a threshold level (or the voltage has decreased below a threshold level).

This threshold level can be determined empirically as follows. First, a fuel cell (or stack) is operated normally (under a wetting condition) and then under a drying condition and its resistance (and/or voltage)/time curve is determined. The fuel cell or stack is then frozen and restarted at a sub 0° C. temperature under a normal (wetting) operating condition, and the initial performance (before the stack temperature exceeds 0° C.) of the fuel cell or stack is measured. If there is a degradation in initial performance, it can be concluded that the membrane was dried beyond its critical moisture level, and that the drying time has to be shortened (or the rate of drying reduced). Progressively shorter periods of drying times can be tested until a drying time (and corresponding resistance) is found that does not dry out the membrane such that the initial cold start-up performance is degraded. With enough empirical testing, a database can be compiled for appropriate drying times and rates for various operating conditions.

Figure 5:
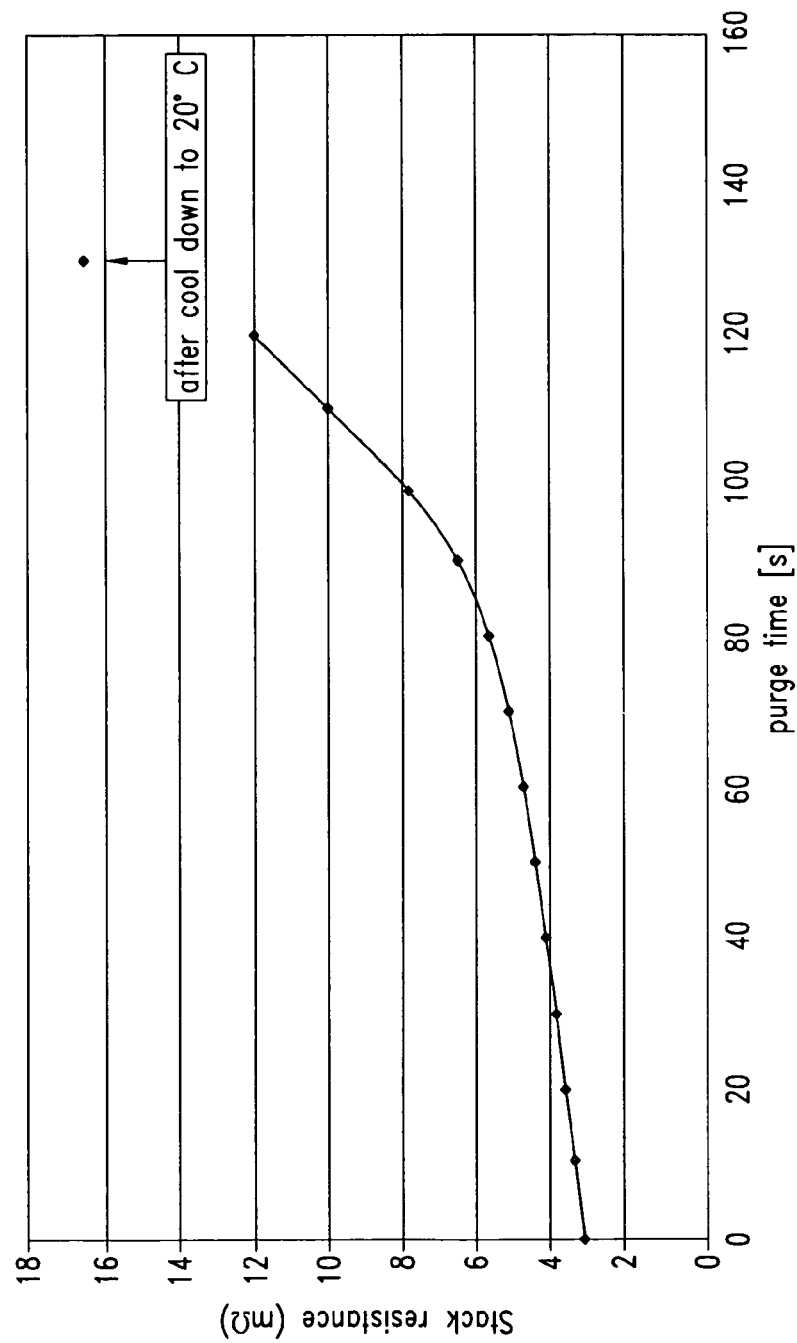
FIG. 5 is a graph showing the change of resistance over time in a fuel cell stack operated under a drying condition.

An example of a resistance/time curve is shown in FIG. 5. The resistance of a Ballard fuel cell stack (10 cells) was monitored during a drying operation. The stack was initially operated at steady state producing 300 A with an air/fuel stoichiometry ratio of 1.8/1.2 and at a stack temperature of 70° C. The inlet oxidant and fuel streams were humidified by passing same through a humidifier upstream of the stack. At time=0, humidification of the oxidant and fuel streams was stopped and the external load was disconnected from the stack. At about 70° C., a drying operation was then carried out in which the unhumidified oxidant and fuel streams continued to flow through the stacks at 89/25 slpm at 0.6 barg for 120 seconds. A relatively linear but small increase in resistance from about 3 mΩ to about 5 mΩ was observed after 60 seconds; a steeper increase in slope was observed at around 90 seconds and continued in a generally linear fashion until the drying operation was stopped; the resistance measured at the end of 120 seconds was 12 mΩ.

A series of shutdown and cold start tests was also performed on the stack, the resistance of the stack after each drying operation was measured. The stack was initially operated at steady state producing 300 A with an air/fuel stoichiometry ratio of 1.8/1.2 and at a stack temperature of 70° C. The inlet oxidant and fuel streams were humidified by passing same through a humidifier upstream of the stack. At time=0, humidification of the oxidant and fuel streams was stopped and the external load was disconnected from the stack. At about 70° C., a drying operation was then carried out in which the unhumidified oxidant and fuel streams continued to flow through the stacks at a fuel/air rate of 25/89 slpm (for 10 cells) at 0.6 barg. A drying operation was applied for each test run for different time lengths and the corresponding stack resistance was measured at the end of the drying operation, as follows: 12 mΩ (test 1), 7.2 mΩ (test 2), 6.23 mΩ (test 3), 5.2 mΩ (test 4), and 5.99 mΩ (test 5). The stack was then allowed to cool to about 20° C. and was subjected to a second drying operation of unhumidified fuel and air flow at a fuel/air rate of 25/89 slpm (10 cell) and at 0.6 barg for about 1 minute.

The stack was then cooled to about −10° C. and held at that temperature. Thereafter, the stack was started at about −10° C. and the resistance was measured for each test run as follows: 16 mΩ (test 1), 10 mΩ (test 2), 9.23 mΩ (test 3), 6.2 mΩ (test 4), and 7.89 mΩ (test 5). Current was varied in steps of 5 A between a range of 5 and 50 A for about 10 seconds per step and the cell voltage at each current was measured. It was observed that the higher the measured stack resistance (both at shutdown and at start-up), the lower the measured cell voltage, that is, the worse the initial cold start performance, that is, the performance of the cell below 0° C. It is theorized that the performance losses correlate with the degree of MEA dryness prior to freezing, which is dependent on the parameters of the drying operation during shut down.

Figure 6:
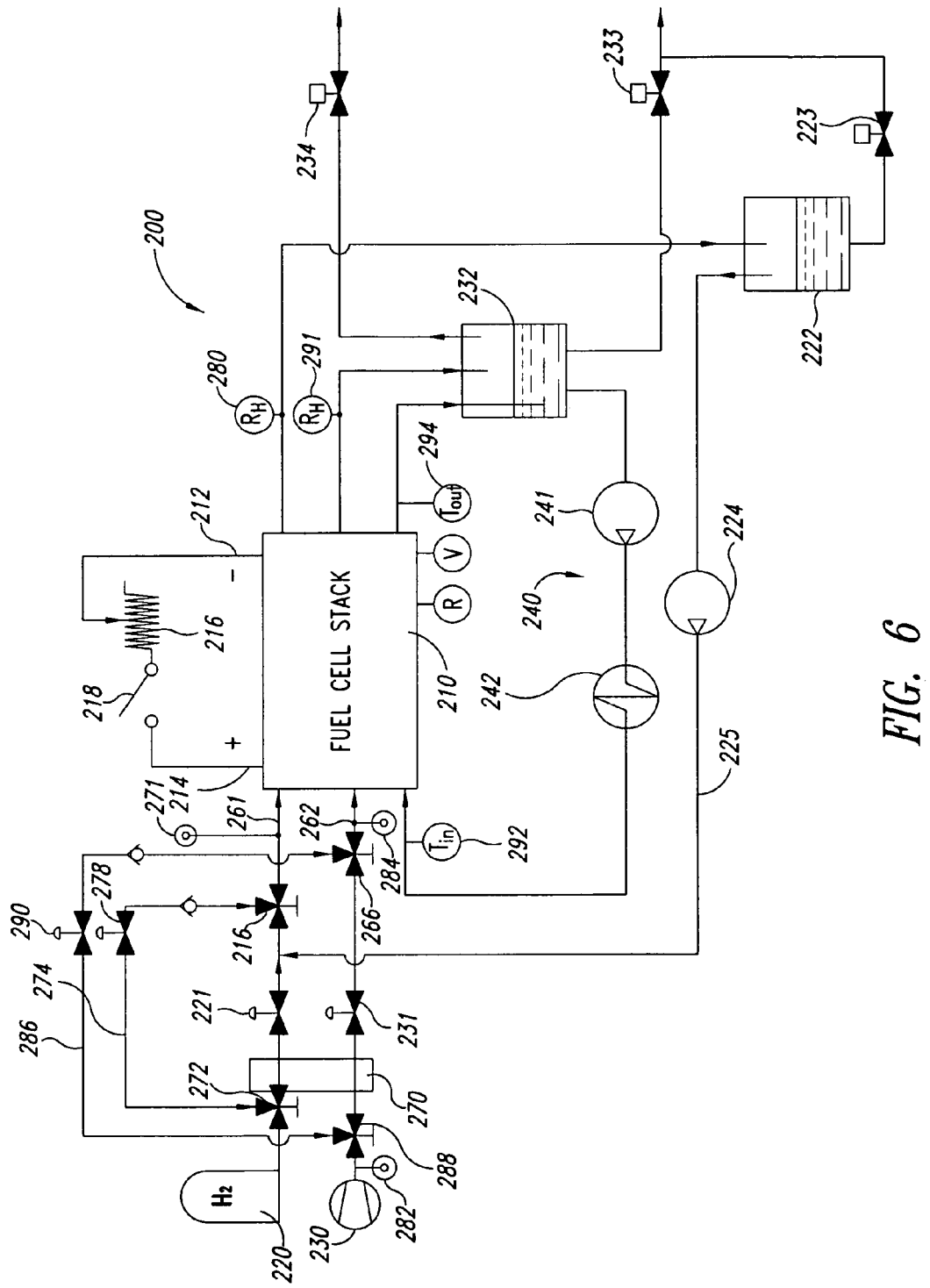
FIG. 6 is a schematic diagram of a fuel cell electric power generation system incorporating a humidifier bypass purge system, actuators, and sensors that can cooperate to perform a controlled fuel cell drying operation at shutdown.

FIG. 6 is a schematic diagram of a fuel cell electric power generation system 200 comprising a fuel cell stack 210 according to one embodiment of the present apparatus. Fuel cell stack 210 includes negative and positive bus plates 212, 214, respectively, to which an external circuit comprising a variable load 216 is electrically connectable by closing switch 218. System 200 includes a fuel (hydrogen) circuit, an oxidant (air) circuit, and a coolant water circuit. The reactant and coolant streams are circulated in the system in various conduits illustrated schematically in FIG. 6.

During normal operation, a hydrogen supply 220 is humidified in humidifier 270 then delivered to stack 210 via hydrogen conduit 261. Flow through conduit 261 is controlled by hydrogen pressure regulator 221. Hydrogen delivery pressure is measured by pressure sensor 271. If humidification of the hydrogen stream is not desired, hydrogen flow can be bypassed around humidifier 270 through three-way valve 272 connected to conduit 261 upstream of humidifier 270, through hydrogen bypass conduit 274 connected to valve 272, and through a three-way bypass valve 276 connected to conduit 261 downstream of humidifier 270. Flow through bypass conduit 274 is controlled by hydrogen pressure regulator 278. Alternatively, and for certain types of humidifiers, the humidifier can be bypassed by reducing or stopping the transfer of water to a reactant stream passing through the humidifier.

Water in the hydrogen exhaust stream exiting stack 210 is accumulated in a knock-out drum 222, which can be drained by opening valve 223. Unreacted hydrogen is recirculated to stack 210 by a pump 224 in recirculation loop 225. The relative humidity of the hydrogen exhaust stream is measurable by relative humidity sensor 280.

During normal operation, air (oxidant) is humidified in humidifier 270 then delivered to stack 210 via oxidant humidification conduit 262. Conduit 262 has an inlet end connectable to a compressor 230 and an outlet end connected to fuel cell stack 210. Flow through humidification conduit 262 is controlled by oxidant pressure regulator 231. Oxidant flow rate is measured by mass flow sensor 282 and oxidant pressure is measured by pressure sensor 284. If humidification of the oxidant stream is not desired, oxidant flow can be bypassed around humidifier 270 through a three-way valve 288 connected to conduit 262 upstream of humidifier 270, through oxidant bypass conduit 286 connected to valve 288, and through a three-way bypass valve 266 connected to conduit 286 downstream of humidifier 270. Flow through bypass conduit 286 is controlled by oxidant pressure regulator 290.

Water in the oxidant exhaust stream exiting stack 210 is accumulated in reservoir 232, which can be drained by opening valve 233, and the air stream is vented from the system via valve 234. The relative humidity of the air exhaust stream is measured by relative humidity sensor 291.

In coolant water loop 240, water is pumped from reservoir 232 and circulated through stack 210 by pump 241. The temperature of the water is adjusted in a heat exchanger 242. The coolant inlet and outlet temperatures are measured by temperature sensors 292, 294.

The cold start capability and freeze tolerance of the system 200 can be improved by reducing the amount of water remaining within the flow channels 14a and 16a, and in the electrodes of the MEA of each fuel cell in the stack 210 upon cessation of operation and reduction of the stack core temperature to near or below the freezing temperature of water. As used herein, "freeze tolerance" refers to the ability of a fuel cell or fuel cell stack to maintain substantially the same performance after one or more freeze/thaw/ cold start cycles, where the stack after being shut off is exposed to sub 0° C. temperatures for an extended period of time then is cold started below 0° C. or is thawed above 0° C. then started.

On shutdown, the operating parameters of fuel cell stack 210 are selected so that stack 210 operates under a drying condition until the voltage drops below (or resistance or impedance increases above) a threshold level. A number of different stack operating parameters can be adjusted to change the operation of stack 210 from a wetting condition to a drying condition, such as air or fuel flow rates, stoichiometries, temperatures, pressures, compositions, and relative humidities. A suggested shutdown sequence comprising a drying operation is as follows:

(a) receive shutdown instructions;
(b) turn off coolant pump 241 so that coolant flow is stopped (increases stack operating temperature);
(c) actuate bypass valves 272, 276, 288 and 266 so that reactant supply to stack bypasses humidifier 270 (reduces the reactant inlet relative humidities);
(d) adjust compressor operation to decrease oxidant supply pressure;
(e) adjust fuel pressure regulator 278 to decrease fuel inlet pressure;
(f) once stack resistance or impedance has exceeded (or the voltage has decreased below) a predetermined threshold value, shut off compressor 230 and close valves 221, 231, 278 and 290 (shuts off the fuel and oxidant supplies to the stack);
(g) shut off hydrogen recirculation pump 224; and
(h) open switch 218 (disconnects the stack from the external circuit).

Steps (b) to (h) should be completed before the stack 210 overheats. Empirical testing can be performed to determine the maximum period of time for performing these steps before overheating occurs. Alternatively or in addition, the stack temperature can be monitored during the shut down operation; if the stack gets too hot, the coolant pump 241 can be reactivated.

System 200 illustrated in FIG. 6 has a number of sensors to monitor various stack operating parameters during stack operation, including relative humidity sensors 280 and 291 located in the exhaust conduits downstream of the stack, reactant supply pressure sensors 271, 284, and inlet and outlet coolant temperature sensors 292 and 294. While these sensors are sufficient to carry out the drying operation (b) to (h) described above, additional sensors (not shown) are required if data for the variables specified in the water flux equations (1) to (8) are desired, for example, mass flow sensors for the oxidant and fuel supplies, fuel and oxidant relative humidity sensors upstream of stack 210, fuel and oxidant pressure sensors downstream of the stack, stack current sensor, and oxygen and hydrogen concentration sensors. These sensors can be useful to precisely monitor the water flux in and out of the cell, so that a water management program can be carried out during stack operation to prevent excess water from building up in the stack. By carrying out such a water management program, the amount of water remaining at shutdown can be reduced, thereby reducing the need for drying operation. Such a water management program can also improve system performance and efficiency during operation, as the mass transport limitations associated with excess water accumulated in the fuel cell will be reduced.

System 200 as illustrated in FIG. 6 is supplied with air from the compressor 230 and with pure hydrogen from a pressurized hydrogen tank 220. For greater output voltages, it is advantageous to supply fuel cells with more concentrated reactant streams and preferably with pure reactant streams (for example, pure hydrogen and oxygen reactants). This is an advantage because the presence of relatively large amounts of non-reactive components in the reactant streams can significantly increase kinetic and mass transport losses in the fuel cells. However, in certain applications it may be impractical to store and provide the desired reactants in pure form. In this connection, hydrogen can be supplied to system 200 by reforming a supply of methanol, natural gas, or the like on site or on board (not shown).

The reformed hydrogen stream tends to contain some carbon dioxide generated as a result of the reforming operation. Air typically has a oxygen concentration of about 21%; the major component in the dilute oxidant air stream is nitrogen. Known approaches can be implemented in system 200 to increase the concentration of the reactant in the reformed fuel and/or air streams, that is, enrichment, to improve the performance of system 200. Such known approaches typically involve separating out a component from the reactant stream, including cryogenic, membrane, and pressure swing adsorption methods. In a cryogenic method, component separation is achieved by preferentially condensing a component out of a gaseous stream. In a membrane method, component separation is achieved by passing the stream over the surface of a membrane that is selectively permeable to a component in the stream. In a pressure swing adsorption (PSA) method, a gas component is separated from a gas stream by preferential adsorption onto a suitable adsorbent under pressure. A PSA apparatus (not shown) can be installed on the fuel supply conduit 261 between the fuel supply 220 and the stack 210 to provide an enriched fuel stream to stack 210. The PSA apparatus can also be installed on the oxidant supply conduit 262 between the air compressor 230 and the stack 210 to provide an enriched oxidant stream to stack 210. By controlling the degree of enrichment provided by the PSA apparatus, the fuel and oxidant concentrations can be controlled (($\phi_f$, $\phi_o$) to encourage the stack to operate under a drying condition during shut down.

System 200 shown in FIG. 6 can be configured so that the oxidant and fuel stream pass through stack 210 in a concurrent flow arrangement. According to another embodiment, one of the fuel and oxidant streams can be reversed so that the oxidant and fuel streams pass through the stack 210 in a counter-flow arrangement (not shown). Such counterflow arrangement will affect the temperature gradients in the stack 210. Temperature sensors (not shown) can be installed in the oxidant and fuel passages to measure the inlet and outlet oxidant and fuel stream temperatures, so that the effect of the temperatures on the water balance formulas can be determined. It may be desirable in embodiments of the present method, to intermittently reverse the reactant flow directions during operation or shut down. An example of apparatus and methods for reversing the relative flow directions of oxidant and fuel through a fuel cell stack is described in U.S. Pat. No. 5,935,726.

It should be noted that the stack can be disconnected from the external circuit prior to starting a drying operation. In such case, an auxiliary power source such as a battery (not shown) is provided to power the various components in the system 200 (for example, air compressor, pumps, actuators, sensors). After the external circuit has been disconnected, $N_{w,p}$ becomes 0 in equation (7) as the electrochemical reaction producing water substantially ceases. Substituting dry oxidant and fuel flow rates $N_{o,in}$, $N_{f,in}$ for oxidant and fuel stoichiometries, and equations (2) to (6) in equation (1), the following water flux equation is derived (wetting condition or water balance):

$$\frac{N_{o,in}}{\varphi_o} \frac{RH_{o,in} p_{s,o,in}}{(p_{o,in} - RH_{o,in} p_{s,o,in})} + \frac{N_{f,in}}{\varphi_f} \frac{RH_{f,in} p_{s,f,in}}{(p_{f,in} - RH_{f,in} p_{s,f,in})} \geq \quad (9)$$

$$\frac{N_{o,in}}{\varphi_o} \frac{p_{s,o,out}}{(p_{o,out} - p_{s,o,out})} + \frac{N_{f,in}}{\varphi_f} \frac{p_{s,f,out}}{(p_{f,out} - p_{s,f,out})}$$

Note that the primary difference between equations (7) and (9) is that the net water influx is reduced by elimination of the water production term $N_{w,p}$ and that the reactant flow rates cannot be defined in terms of stoichiometries, since current is 0. Using equation (9), stack operating parameters can be determined that will cause the stack to operate under a drying condition; equation (9) can be verified by empirical testing using the same test methods that were applied to test equation (7).

In such a shutdown procedure where the external circuit is disconnected before a drying operation is performed, the voltage measured will be the open circuit voltage ($V_{OC}$) (or open circuit resistance or impedance if resistance or impedance are measured). Empirical testing can be performed to determine at what voltage drop (or resistance or impedance increase) the drying operation should be stopped.

Alternatively, rather than disconnecting the external circuit entirely before a drying operation is performed, the power supplied to the external circuit can be reduced and/or varied during the drying operation. Reducing or varying the supply of power can result in less water production thereby making it easier to establish a drying condition. In a preferred embodiment, a small electrical load can be periodically connected and disconnected so that the voltage alternates between $V_{OC}$ (the open circuit voltage) and $V_T$ (the voltage observed during the periodic connection of the electrical load). This can allow more accurate control of the drying operation at shutdown than when the external circuit is disconnected, as $V_T$ is more sensitive to the water content of the stack than $V_{OC}$.

Figure 7:
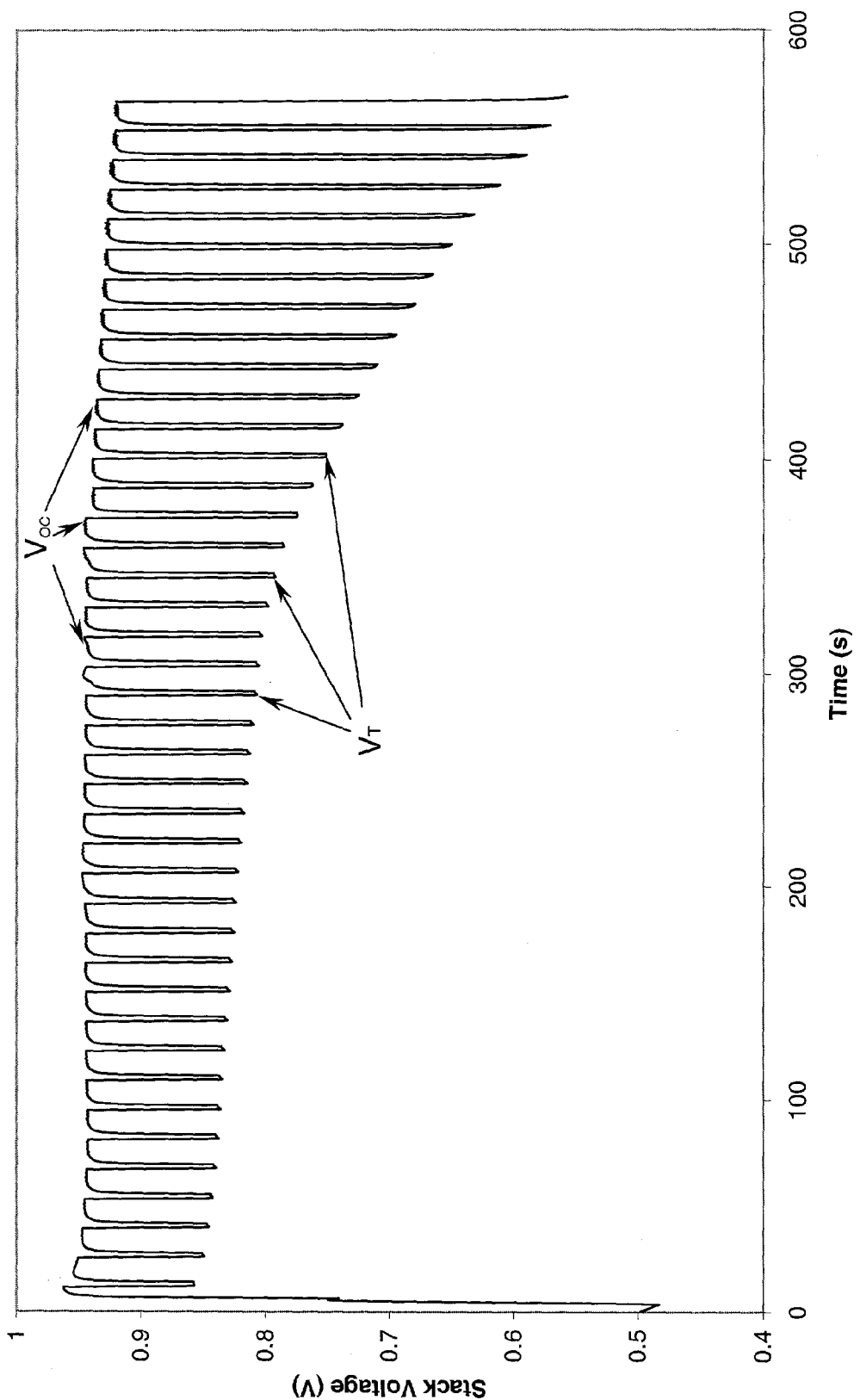
FIG. 7 is a graph showing the change in voltage over time for a fuel cell stack shut down procedure in which the power supplied to the external circuit was substantially reduced and then intermittently disconnected during the drying operation.

FIG. 7 provides an example of a voltage/time curve where the power supplied to the external circuit was substantially reduced and then intermittently disconnected during the drying operation. The stack performance was monitored during the drying operation by monitoring the voltage of the stack (as it oscillated between $V_{OC}$ and $V_T$). A Ballard fuel cell stack (10 cells) was initially operated at steady state producing 300 A with an air/fuel stoichiometry ratio of 1.8/1.2 and at a stack temperature of 70° C. The inlet oxidant and fuel streams were humidified by passing same through a humidifier upstream of the stack.

At time=0, the external load was reduced to zero and humidification of the oxidant and fuel streams was stopped. A drying operation was then carried out in which the unhumidified oxidant and fuel streams continued to flow through the stacks at 37/3.8 slpm at 0.8 barg. A 15 A load was then periodically connected to the stack (on for 2 seconds, off for 5 seconds) The stack voltage was measured throughout the drying operation.

As can be seen in FIG. 7, the change in $V_T$ (that is, while the transient 15 A load was connected) after 500 seconds was significantly larger than the change in $V_{OC}$ (that is, no external load).

Thus, as the deterioration in stack performance is more apparent from the $V_T$ measurements, by employing this procedure, the deterioration in stack performance can be more readily monitored than by measuring the stack voltage under an open circuit condition. Further, as the electrochemical reaction stops after the stack is disconnected from the external circuit, by periodically interrupting the supply of power from the stack to the external circuit before the drying operation is performed, the introduction of additional water during the drying operation was be reduced. The periodic connection of the load would have resulted in some product water production, but less water was be produced than if power was continuously supplied to the external circuit.

The '506 application, from which this application claims priority benefits, is a continuation-in-part of U.S. patent application Ser. No. 09/406,318, entitled "Methods for Improving the Cold Starting Capability of an Electrochemical Fuel Cell" filed Sep. 27, 1999. The '318 application is, in turn, a continuation-in-part of U.S. patent application Ser.

No. 09/138,625 filed Aug. 24, 1998, entitled "Method and Apparatus for Commencing Operation of a Fuel Cell Electric Power Generation System Below the Freezing Temperature of Water". The '625 application is, in turn, a continuation of U.S. patent application Ser. No. 08/659,921 filed Jun. 7, 1996, now U.S. Pat. No. 5,798,186 issued Aug. 25, 1998, also entitled "Method and Apparatus for Commencing Operation of a Fuel Cell Electric Power Generation System Below the Freezing Temperature of Water". The '318, '625 and '921 applications are each incorporated herein by reference in their entirety.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A method of ceasing operation of an electric power generating system comprising a fuel cell stack connectable to an external circuit for supplying power to the external circuit, the stack comprising at least one solid polymer fuel cell, the system further comprising a fuel passage for directing a fuel stream through the stack and an oxidant passage for directing an oxidant stream through the stack, the method comprising:
   (a) establishing a drying condition in which there is a net outflux of water from the stack;
   (b) operating the stack under the drying condition until the water content in the stack has been reduced;
   (c) reducing the power supplied to the external circuit; and
   (d) varying the power supplied to the external circuit wherein the supply of power to the external circuit is intermittently reduced to zero;
   prior to interrupting the supply of power from the stack to the external circuit.

2. The method of claim 1 wherein step (a) comprises adjusting at least one stack operating parameter to cause the stack to operate under a drying condition in which there is a net outflux of water from the stack.

3. The method of claim 1 wherein in step (c) the supply of power to the external circuit is reduced from a first power output to a second power output, and in step (d) the supply of power is varied between the second power output and a third power output.

4. The method of claim 3 wherein the second power output is about five to ten percent of the first power output and the third power output is less than the second power output.

5. The method of claim 3 wherein the third power output is zero.

6. The method of claim 1 wherein in step (d) the power output is varied about every one to ten seconds.

7. The method of claim 6 wherein in step (d) the power output is varied at a substantially constant frequency.

8. The method of claim 2 wherein the at least one stack operating parameter is selected from the group consisting of:
   the relative humidity of at least one of the oxidant and fuel streams;
   the flow rate of at least one of the oxidant and fuel streams;
   the flow rate of at least one of the oxidant and fuel streams;
   the pressure of at least one of the oxidant and fuel streams; and
   the stack temperature.

9. The method of claim 8 wherein prior to establishing a drying condition, a coolant is circulated through the stack to maintain the temperature of the stack within a desired operating range, and where in step (a), the stack temperature is increased by stopping coolant circulation through the stack.

10. The method of claim 8 wherein prior to establishing a drying condition at least one of the oxidant and fuel streams directed to the stack is humidified, and wherein in step (a) the degree of humidification of at least one of the oxidant and fuel streams is reduced.

11. The method of claim 10 wherein the degree of humidification of at least one of the oxidant and fuel streams is reduced by directing at least some of the stream to the stack without humidification.

12. The method of claim 11 wherein the degree of humidification of the stream is reduced by directing at least some of the stream to the stack in fluid isolation from the humidifier.

13. The method of claim 8, wherein in step (a), at least one of the oxidant and fuel stoichiometries is increased.

14. The method of claim 8 wherein in step (a), at least one of the oxidant and fuel stream flow rates is increased.

15. The method of claim 8 wherein in step (a), at least one of the oxidant and fuel stream pressures is decreased.

16. The method of claim 1 wherein in step (b), a parameter indicative of stack performance is monitored and the operation of the system is ceased when the stack performance falls below a threshold value.

17. The method of claim 16 wherein the parameter indicative of stack performance is selected from the group consisting of:
   the resistance of at least one fuel cell in the stack,
   the impedance of at least one fuel cell in the stack, and
   the voltage of at least one fuel cell in the stack.

18. The method of claim 16 wherein the at least one solid polymer fuel cell comprises a membrane electrolyte, and the threshold value corresponds to a critical membrane moisture level.

19. The method of claim 16 wherein the parameter indicative of stack performance is monitored during the period of time that the power to the external circuit is not intermittently reduced to zero.

20. The method of claim 19 wherein the parameter indicative of stack performance is selected from the group consisting of:
   the resistance of at least one fuel cell in the stack,
   the impedance of at least one fuel cell in the stack, and
   the voltage of at least one fuel cell in the stack.

* * * * *